United States Patent
Ishikawa et al.

(10) Patent No.: US 6,541,416 B2
(45) Date of Patent: Apr. 1, 2003

(54) SILICA-GROUP COMPOSITE OXIDE FIBER AND PROCESS FOR THE PRODUCTION THEREOF

(75) Inventors: Toshihiro Ishikawa, Ube (JP); Yoshikatu Harada, Ube (JP); Hidekuni Hayashi, Ube (JP); Shinji Kajii, Ube (JP)

(73) Assignee: Ube Industries, Ltd., Yamaguchi-ken (JP)

( * ) Notice: Subject to any disclaimer, the term of this patent is extended or adjusted under 35 U.S.C. 154(b) by 0 days.

(21) Appl. No.: 09/874,041

(22) Filed: Jun. 6, 2001

(65) Prior Publication Data

US 2002/0001702 A1 Jan. 3, 2002

(30) Foreign Application Priority Data

Jun. 13, 2000 (JP) ......................... 2000-176377

(51) Int. Cl.$^7$ ........................... B01J 21/08; B01J 31/00; C03C 13/00
(52) U.S. Cl. .................... 502/240; 502/158; 502/237; 502/242; 502/243; 502/250; 502/251; 502/258; 502/259; 502/527.24; 502/527.14; 501/35
(58) Field of Search ................ 501/35, 38, 53–55, 501/60–62, 64–70, 72; 502/240, 158, 527.24, 237, 242, 243, 250, 251, 258, 259; 428/364, 366

(56) References Cited

U.S. PATENT DOCUMENTS

| 4,215,033 A | * | 7/1980 | Bowen | 260/42.15 |
|---|---|---|---|---|
| 4,732,879 A | * | 3/1988 | Kalinowski et al. | 502/5 |
| 4,770,935 A | * | 9/1988 | Yamamura et al. | 428/366 |
| 4,961,990 A | * | 10/1990 | Yamada et al. | 428/240 |
| 5,069,816 A | * | 12/1991 | DeSantis et al. | 252/315.5 |
| 5,332,699 A | * | 7/1994 | Olds et al. | 501/36 |
| 5,874,375 A | * | 2/1999 | Zoitos et al. | 502/36 |
| 6,025,298 A | * | 2/2000 | Imoto et al. | 502/300 |
| 6,030,910 A | * | 2/2000 | Zoitos et al. | 501/36 |
| 6,043,170 A | * | 3/2000 | Steinkopf et al. | 501/36 |
| 6,086,844 A | | 7/2000 | Koike et al. | 423/598 |
| 6,110,441 A | * | 8/2000 | Kitaoka | 423/593 |
| 6,136,735 A | * | 10/2000 | Gallo et al. | 501/36 |
| 6,313,051 B1 | * | 11/2001 | Towata et al. | 501/38 |
| 6,358,871 B1 | * | 3/2002 | Sircar | 501/35 |

OTHER PUBLICATIONS

Patent Abstracts of Japan, vol. 018, No. 437 (C–1238) (1994)—Abstract of JP 06–134306, May 1994.

Patent Abstracts of Japan, vol. 018, No. 468 (C–1244) (1994)—Abstract of JP 06–146115, May 1994.

* cited by examiner

Primary Examiner—Mark L. Bell
Assistant Examiner—Patricia L. Hailey
(74) Attorney, Agent, or Firm—Wenderoth, Lind & Ponack, L.L.P.

(57) ABSTRACT

A silica-group composite oxide fiber formed of a composite oxide phase of an oxide phase (first phase) mainly made of a silica component and a metal oxide phase (second phase) excluding silica, in which the existent ratio of at least one metal element of a metal oxide constituting the second phase upward slopingly increases toward the surface layer of the fiber and a process for the production thereof.

15 Claims, 2 Drawing Sheets

SILICA-GROUP COMPOSITE OXIDE FIBER AND PROCESS FOR THE PRODUCTION THEREOF

FIELD OF THE INVENTION

The present invention relates to a silica-group composite oxide fiber having excellent photocatalyst function, electrical function and/or thermal-catalyst function and having high strength and a process for the production thereof. Specifically, the present invention relates to a fiber which is composed of a central portion (silica phase) covering mechanical properties and an oxide phase constituting a surface layer and a layer close to the surface layer which oxide phase covers various functions and which has a slope constitution toward the surface layer and a process for the production thereof.

DESCRIPTION OF THE PRIOR ART

Many studies have been carried out concerning an photocatalyst effect on a semiconductor, typified by titanium dioxide, since the latter half of the 1970s stating with decomposition reaction of water. When the above photocatalyst effect is utilized, conventionally, titania crystal grains are fixed on a substrate and used. However, many problems occur concerning a bonding method so that in recent years a keen attention is focused on a titania fiber free from the fixation problem.

For example, JP-A-5-184923 discloses a method of synthesizing a fiber composed of crystals of anatase type titania and vanadium oxide which method comprises dissolving titanium alkoxide and a vanadium compound in alcohol, carrying out hydrolysis to prepare a sol-like material, forming the sol-like material into a fiber-like material, gelating the fiber-like material and heat-treating the gel in the range of from 200 to 700° C. In examples of the above JP-A-5-184923, there is mainly described a fiber containing titania and vanadia and further containing quantities of a silica component. With regard to catalyst activity as a fabric using the above fiber, there is shown only catalyst activity of a fabric obtained by mixing only 20% of the above fiber into an E glass fiber made of silica.

Conventionally, it is known that a titania fiber synthesized by the sol-gel method is extremely fragile. As a study for increasing the strength thereof, for example, "Yogyo-Kyokai-shi", vol 94 (12), pages 1,243 to 1,245, (1986) describes the coexistence of a silica component. The above method described in examples of JP-A-5-184923 exactly adopts this method. Further, JP-A-11-5036 publication discloses a silica-titania fiber for a photocatalyst according to the sol-gel method and a production process thereof. In this case, likewise, the fiber has an extremely low strength of 0.1 to 1.0 GPa.

In addition to the above methods, there are the following reports as a production process of titania. For example, "Journal of Material Science Letters" 5 (1986), 402–404, reports a method of synthesizing a gel-like titania fiber (anatase) in which hydrochloric acid coexists in an alcohol solution of titanium alkoxide, hydrolysis is carried out to obtain a colloidal substance and the colloidal substance is spun, heated under a humidified atmosphere and then temperature-increased in air to obtain the gel-like titania fiber.

Further, "The American Ceramic Society Bulletin", May 1998, 61–65, reports a method of producing a titania fiber by adding water to fine particles of titania to obtain a slurry, mixing the slurry with viscose to prepare a viscous fluid, forming the viscous fluid into a fiber and calcining the fiber in air under heat at a high temperature.

Each of these fibers is formed through an agglomeration step of primary particles of titania so that the inside of each fiber has a serious defect. Even when a photocatalyst function is recognized, therefore, it is extremely fragile. Accordingly, it is required to solve many problems for practical uses. Further, in systems where a silica component coexists in order to improve strength, titania and silica exist in a mixed state so that these systems can not provide sufficient photocatalyst activity when compared with titania alone. This is also a significant problem for practical uses.

When a photocatalyst fiber is used as a filter, it is naturally preferred that the photocatalyst fiber has a higher fiber strength since the photocatalyst fiber is exposed to a high-speed gas flow for a long period of time. Particularly, in consideration of its application to a gas emitted from an aircraft engine or a motor vehicle engine, it is strongly desired to develop a fiber having high-strength photocatalyst function or thermal-catalyst function that goes beyond conventional common sense.

SUMMARY OF THE INVENTION

It is an object of the present invention to provide a composite oxide fiber having a metal oxide phase (first phase) covering mechanical properties and having a metal oxide phase (second phase) expressing various functions and mainly composed of a metal different from a metal oxide of the first phase on its surface layer and in a region close to the surface layer and a process for the production thereof.

It is another object of the present invention to provide a composite oxide fiber having excellent strength and having excellent effect of expressing various functions such as photocatalyst function or thermal-catalyst function and a process for the production thereof.

According to the present invention, there is provided a silica-group composite oxide fiber formed of a composite oxide phase of an oxide phase (first phase) mainly made of a silica component and a metal oxide phase (second phase) excluding silica, in which the existent ratio of at least one metal element of a metal oxide constituting the second phase upward slopingly increases toward the surface layer of the fiber.

According to the present invention, further, there is provided a silica-group composite oxide fiber according to above, wherein the existent ratio of the first phase based on the fiber as a whole is 98 to 40% by weight and the existent ratio of the second phase based on the fiber as a whole is 2 to 60% by weight.

According to the present invention, further, there is provided a silica-group composite oxide fiber according to above, wherein the oxide phase mainly made of a silica component contains a metal element or a metal compound which can form a solid solution or a eutectic compound with the silica.

According to the present invention, further, there is provided a silica-group composite oxide fiber according to above, wherein the metal oxide phase excluding silica is made of titania, its eutectic compound or an lead/zirconium/titanium type oxide.

According to the present invention, further, there is provided a silica-group composite oxide fiber according to above, wherein the slope in the existent ratio of at least one metal element of a metal oxide constituting the metal oxide phase excluding silica exists from the fiber surface to a depth in the range of 5 nm to 500 nm.

According to the present invention, further, there is provided a silica-group composite oxide fiber according to above, wherein the slope in the existent ratio of at least one metal element of a metal oxide constituting the metal oxide phase excluding silica exists to a depth of ⅓ of the diameter of the fiber.

According to the present invention, further, there is provided a silica-group composite oxide fiber according to above, wherein the metal oxide of the second phase is titania which has a crystal particle diameter of 15 nm or less and has photocatalyst and/or thermal catalyst functions.

According to the present invention, further, there is provided a process for the production of the silica-group composite oxide fiber recited above, which process comprises melt-spinning a modified polycarbosilane having a structure obtained by modification of a polycarbosilane having a main chain structure represented by the formula,

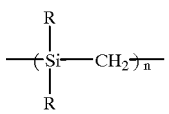

in which R is a hydrogen atom, a lower alkyl group or a phenyl group and n is an integer of 1 to 30,
and having a number average molecular weight of 200 to 10,000 with an organic metal compound, or a mixture of the modified polycarbosilane and an organic metal compound to obtain a spun fiber, infusibilizing the spun fiber, and then calcining the infusible fiber in air or in oxygen.

According to the present invention, further, there is provided a process recited above, wherein the organic metal compound is a compound having a basic structure of the formula M(OR')n or the formula MR"m,
in which M is a metal element, R' is an alkyl group having 1 to 20 carbon atoms or a phenyl group, R" is acetyl acetonate, and each of m and n is an integer of more than 1.

According to the present invention, further, there is provided a process according to above, wherein the modified polycarbosilane is a product in which the organic metal compound is bonded to the polycarbosilane as a monofunctional polymer.

According to the present invention, further, there is provided a process according to above, wherein the mixture is formed of the modified polycarbosilane and a low-molecular weight organic metal compound which is a monomer, a dimer or a trimer.

According to the present invention, further, there is provided a process according to above, wherein the modified polycarbosilane contains a modified polycarbosilane having a low molecular weight.

DETAILED DESCRIPTION OF THE INVENTION

Figure 1:
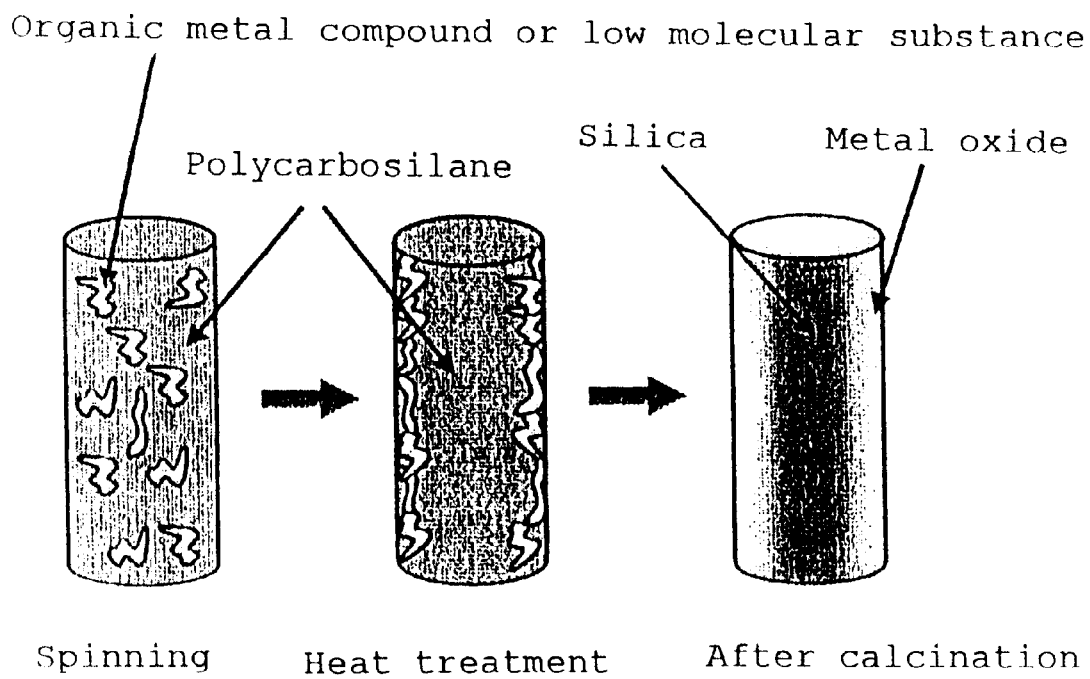
FIG. 1 schematically shows steps of the generation of an oxide fiber in which a metal oxide phase excluding silica upward slopingly increases toward the surface of a fiber, provided by the present invention.

The present inventors have found that a precursor fiber made of an organosilicon polymer is heat-treated and then the heat-treated precursor fiber is calcined in air at a high temperature, whereby a dense silica fiber having high strength can be obtained. Then, the present inventors have found that when an organic metal compound having a low molecular weight or a reaction substance of a low molecular-weight organosilicon polymer with a organic metal compound having a low molecular weight coexists in the above organosilicon polymer, low molecular weight substances including the above organic metal compound component selectively move to the fiber surface by bleeding in a heat-treatment step after spinning and an oxide layer (oxide layer having an intended catalyst function) derived from the above low molecular weight substances is effectively formed on the fiber surface by calcination in air after the heat-treatment. Furthermore, it is also found that the fibers obtained by the above method are remarkably dense and have high strength.

A step of producing silica from an organosilicon polymer as a starting material includes an oxidation step converting a silicon-carbon bond to a silicon-oxygen bond. In this step, it is expected that its volume is increased by approximately 1.37 times. This change is attained at a relatively low temperature of at least 600° C. so that a dense silica-group composite fiber may be effectively obtained by calcination. It is supposed that the increase in strength described above is accordingly attained.

That is, the present invention relates to a silica-group composite oxide fiber formed of a composite oxide phase of an oxide phase (first phase) mainly made of a silica component and a metal oxide phase (second phase) excluding silica, which silica-group composite oxide fiber is characterized in that the existent ratio of at least one metal element of a metal oxide constituting the second phase upward slopingly increases toward the surface layer of the fiber.

In the present invention, the oxide phase (first phase) mainly made of a silica component may be amorphous or crystalline. Further, it may contain a metal element or a metal compound which can form a solid solution or a eutectic compound with silica. Although a metal element (A) which can form a solid solution with silica or a metal element (B) whose oxide can form a compound having a specific constitution with silica is not specially limited, for example, (A) includes titanium and (B) includes aluminum, zirconium, yttrium, lithium, sodium, barium, calcium, boron, zinc, nickel, manganese, magnesium and iron.

The first phase forms an inside phase of the fiber provided by the present invention and it plays an important role in covering mechanical properties. The existent ratio of the first phase based on the fiber as a whole is preferably 98 to 40% by weight. It is preferred to control the existent ratio of the first phase in the range of from 50 to 95% by weight for expressing functions of the second phase sufficiently and for expressing high mechanical properties concurrently.

On the other hand, the metal oxide constituting the second phase plays an important role in expressing intended functions in the present invention and it is selected depending upon the intended functions. For example, when photocatalyst function is required, it includes titania, its eutectic compound or a titania type solid solution substituted with a specific element. When piezoelectric properties are expected, a lead/zirconium/titanium type oxide or the like is selected. When photocatalyst or thermal catalyst function is required, the metal oxide constituting the second phase preferably has a crystal particle diameter of 15 nm or less, particularly preferably 10 nm or less. Although the existent ratio of the second phase constituting a surface layer portion of the fiber differs depending upon the kind of the oxide, it is preferably 2 to 60% by weight. It is preferred to control the existent ratio of the second phase in the range of from 5 to 50% by weight for expressing its functions sufficiently and for expressing high strength concurrently.

The existent ratio of at least one metal element of a metal oxide constituting the second phase upward slopingly increases toward the fiber surface. The thickness of a region where the slope in the constitution is apparently recognized is preferably controlled in the range of 5 to 500 nm. The slope region may reach to approximately ⅓ of the diameter of a fiber. In the present invention, further, each of the existent ratios of the first phase and the second phase independently refers to "% by weight" of a metal oxide of the first phase or a metal oxide of the second phase based on the whole metal oxides composed of the metal oxide constituting the first phase and the metal oxide constituting the second phase, i.e., based on the whole fiber.

The process for the production of the silica-group composite oxide fiber having a slope structure, provided by the present invention, will be explained hereinafter.

In the present invention, a modified polycarbosilane having a structure obtained by modification of a polycarbosilane having, mainly, a main chain structure represented by the following formula,

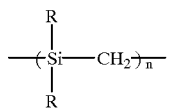

in which R is a hydrogen atom, a lower alkyl group or a phenyl group and n is an integer of 1 to 30,
and having a number average molecular weight of 200 to 10,000 with an organic metal compound, or a mixture of the modified polycarbosilane and an organic metal compound is melt-spun to obtain a spun fiber, the spun fiber is infusibilized, and then the infusible fiber is calcined in air or in oxygen, whereby the silica-group composite oxide fiber can be produced.

The first step of the process of the present invention is a step of producing a modified polycarbosilane having a number average molecular weight of 1,000 to 50,000 as a starting material used for producing the silica-group composite fiber. The fundamental production process of the above modified polycarbosilane is remarkably similar to that of JP-A-56-74126. However, in the present invention, it is required to carefully control the bonding state of a functional group described therein. The general outlines thereof will be explained hereinafter.

The modified polycarbosilane as a starting material is derived mainly from a polycarbosilane having a main chain structure represented by the formula,

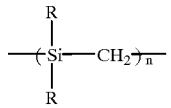

in which R is a hydrogen atom, a lower alkyl group or a phenyl group and n is an integer of 1 to 30,
and having a number average molecular weight of 200 to 10,000 and an organic metal compound having a basic structure of the formula M(OR')n or the formula MR"m, in which M is a metal element, R' is an alkyl group having 1 to 20 carbon atoms or a phenyl group, R" is acetyl acetonate, and each of m and n is an integer of more than 1.

Here, for producing the fiber having a slope constitution, provided by the present invention, it is required to select slow reaction conditions under which the above organic metal compound forms a monofunctional polymer with the polycarbosilane and only part of the organic metal compound forms a bond with the polycarbosilane. For the above purpose, it is required to carry out the reaction at a temperature of 280° C. or lower, preferably 250° C. or lower, in an inert gas. Under the above reaction conditions, the reaction of the above organic metal compound with the polycarbosilane is a bonding as a monofunctional polymer (i.e., a pendant-like bonding) and no large increase in molecular weight occurs. The thus obtained modified polycarbosilane in which the organic metal compound is partially bonded plays an important role in improving the compatibility of the polycarbosilane and an organic metal compound.

In the case of a difunctional polymer, a trifunctional polymer or a tetrafunctional polymer, the polycarbosilane forms a cross-linking structure and a noticeable increase in molecular weight is observed. In this case, sudden heat generation and an increase in melt viscosity occur in the reaction. On the other hand, when the above monofunctional polymer is formed and an unreacted organic metal compound remains, conversely, a decrease in melt viscosity is observed.

In the present invention, it is preferred to select conditions under which an unreacted organic metal compound is intentionally left. The present invention uses mainly, as a starting material, a substance in which the above modified polycarbosilane coexists with an organic metal compound in an unreacted state or an organic metal compound which is dimer, trimer or so. However, the modified polycarbosilane alone may be similarly used as a starting material when the modified polycarbosilane contains a modified polycarbosilane component having an extremely low molecular weight.

In the second step of the process of the present invention, the modified polycarbosilane obtained in the first step or a mixture of the modified polycarbosilane and an organic metal compound having a low molecular weight is thermally melted to form a spinning solution, optionally the spinning solution is filtered to remove substances which are to be detriment at the time of spinning such as a microgel or impurities, and the spinning solution is spun with a generally used synthetic fiber-spinning machine. While the temperature of the spinning solution at the spinning time differs depending upon a softening temperature of the modified polycarbosilane as raw materials, it is advantageous to select a temperature in the range of from 50 to 200° C. The above spinning machine may be provided with a humidifying and heating cylinder in a nozzle bottom portion as required. The diameter of a fiber is adjusted by changing the amount of ejection from a nozzle and the take-up speed of a high-speed take-up unit attached to a bottom portion of the spinning machine.

In addition to the above-described melt spinning, the second step of the process of the present invention can give an intended fiber by dissolving the modified polycarbosilane obtained in the first step or a mixture of the modified polycarbosilane and an organic metal compound having a low molecular weight in, for example, benzene, toluene, xylene or a solvent which can dissolve the modified polycarbosilane and the organic metal compound having a low molecular weight, to form a spinning solution, optionally filtering the spinning solution to remove substances which are to be detriment at the time of spinning such as a microgel or impurities, and spinning the spinning solution with a generally used synthetic fiber-spinning machine by a dry spinning method while controlling the take-up speed.

In these spinning steps, a spinning cylinder may be attached to the spinning machine as required and an atmosphere in the cylinder is replaced with a mixed atmosphere with at least one gas selected from the above solvents or with an atmosphere of air, an inert gas, heated air, a heated inert gas, steam, an ammonia gas, a hydrocarbon gas or an organosilicon compound gas, whereby the solidification of a fiber in the spinning cylinder can be controlled.

Next, in-the third step of the process of the present invention, the above spun fiber is preliminarily heated in an oxidizing atmosphere under the action of tension or no tension, to infusibilize the spun fiber. The purpose of this step is to prevent the fiber from melting in the following step of calcination and to prevent adjacent fibers from bonding to each other. The temperature for the treatment and the time for the treatment differ depending upon a constitution. Although not specially limited, generally, the reaction is carried out under conditions in the range of 50 to 400° C. for several hours to 30 hours. The above oxidizing atmosphere may contain moisture, nitrogen oxide, ozone, etc., which increase the oxidation strength of the spun fiber, and an oxygen partial pressure may be changed intentionally.

In some cases, the softening temperature of the spun fiber becomes less than 50° C. according to the ratio of substances having a low molecular weight in raw materials. In these cases, a treatment for promoting the oxidation of a fiber surface is previously carried out at a temperature lower than the above treatment temperature in some cases. In the third step and the second step, there is advanced the bleedout of a compound having a low-molecular weight, contained in the raw material, to the fiber surface. It is considered that the ground of an intended slope constitution is accordingly formed.

In the next fourth step of the process of the present invention, the above infusible fiber is calcined under tension or no tension at a temperature in the range of 500 to 1,800° C. in an oxidizing atmosphere, to obtain an intended silica-group composite oxide fiber formed of a composite oxide phase of an oxide phase (first phase) mainly made of a silica component and a metal oxide phase (second phase) excluding silica, in which the existent ratio of at least one metal element of a metal oxide constituting the second phase upward slopingly increases toward the surface layer of the fiber. In this step, organic components contained in the infusible fiber are fundamentally oxidized. However, the organic components remain in the fiber as carbon or carbide in some cases according to selected conditions. Even under such a state, such a fiber is used as it is so long as there is caused no hitch with regard to intended functions. When some hitches are caused, a further oxidizing treatment is carried out. In this case, it is required to select a temperature and a treatment time which cause no problems concerning an intended slope constitution and an intended crystal structure.

FIG. 1 schematically shows steps of the generation of an oxide fiber having an intended slope constitution, provided by the present invention.

According to the present invention, there are provided a composite oxide fiber having a metal oxide phase (first phase) covering mechanical properties and mainly made of a silica component and having a metal oxide phase (second phase) expressing various functions and mainly made of a metal different from a metal oxide of the first phase on its surface layer or in a region close to the surface layer and a process for the production thereof.

According to the present invention, further, there is provided a composite oxide fiber having excellent strength and having excellent effect of expressing various functions such as photocatalyst function or thermal-catalyst function and a process for the production thereof.

EXAMPLES

The present invention will be explained with reference to Examples hereinafter.

Referential Example 1

2.5 liters of anhydrous toluene and 400 g of metallic sodium were placed in a three-necked flask having a volume of 5 liters, the mixture was heated to the boiling point of toluene under a flow of nitrogen gas, and 1 liter of dimethyldichlorosilane was dropwise added thereto over 1 hour. After the completion of the addition, the mixture was refluxed under heat for 10 hours to obtain a precipitate. The precipitate was recovered by filtration, and washed with methanol and then with water to give 420 g of a white powder polydimethylsilane.

250 g of the polydimethylsilane was placed in a three-necked flask equipped with a water-cooling refluxing device, and allowed to react under heat at 420° C. for 30 hours under a flow of nitrogen gas, to obtain a polycarbosilane having a number average molecular weight of 1,200.

Example 1

400 g of xylene and 50 g of tetrabutoxytitanium (TBT) were added to 45 g of the polycarbosilane synthesized in Referential Example 1, the mixture was preliminarily heated at 100° C. for 1 hour, then, the mixture was slowly temperature-increased up to 190° C. to distill the xylene off, and the resultant mixture was allowed to react at the above temperature for 5 hours, to obtain a modified polycarbosilane. The modified polycarbosilane was measured for a molecular weight distribution by gel permeation chromatography (GPC). As a result, it was confirmed that approximately 80% or higher of the TBT used remained in the state of an unreacted monomer.

The modified polycarbosilane was dissolved in xylene, the mixture was placed in a spinning machine made of glass, the mixture was temperature-increased in the spinning machine in which nitrogen had been sufficiently substituted to distill the xylene off and the resultant mixture was melt-spun at 155° C.

The spun fiber was stepwise heated up to 135° C. in air to form an infusible fiber, and the infusible fiber was calcined at 1,300° C. in air for 1 hour to obtain a titania/silica fiber.

Figure 2:
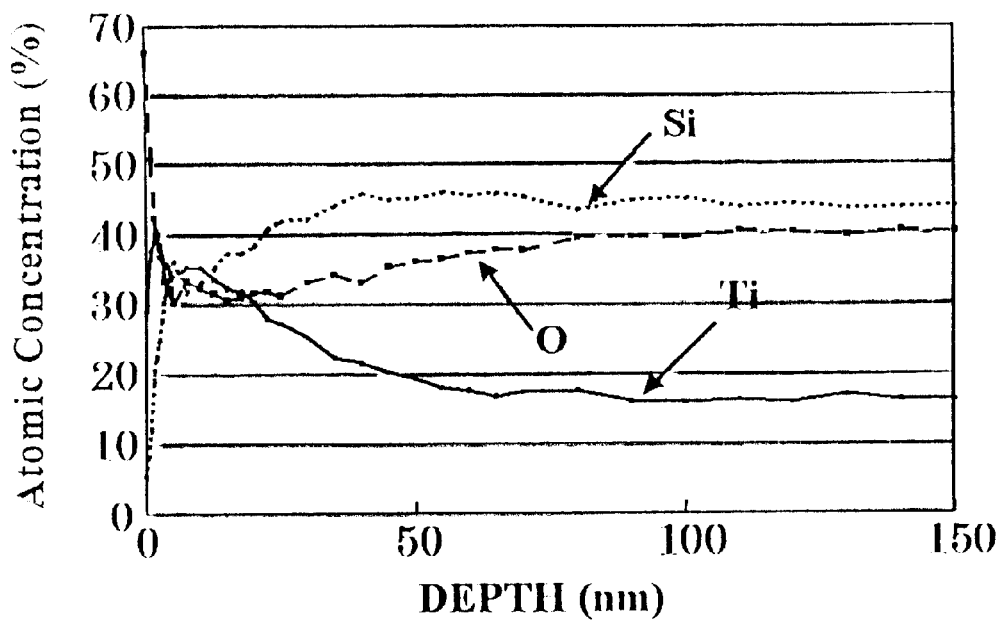
FIG. 2 is a graph showing the results obtained from examination for constitutional changes of the fiber obtained in Example 1 of the present invention from the surface of the fiber toward the inside by Auger electron spectrum.

The above obtained fiber (average diameter: 10 $\mu$m) was analyzed by X-ray diffraction and it was found that the fiber was composed of an amorphous silica and an anatase type titania. Constitutional changes from the surface of the fiber toward the inside of the fiber were analyzed by Auger electron spectrum, and FIG. 2 shows the results. According to the analysis, it was found that the titanium upward slopingly increased toward the surface in a region of from the surface to a depth of approximately 60 nm in the above fiber.

The existent ratio of titanium oxide based on the fiber as a whole was 15% by weight. The titanium oxide of the fiber surface had an average crystal particle diameter of 8 nm.

Figure 3:
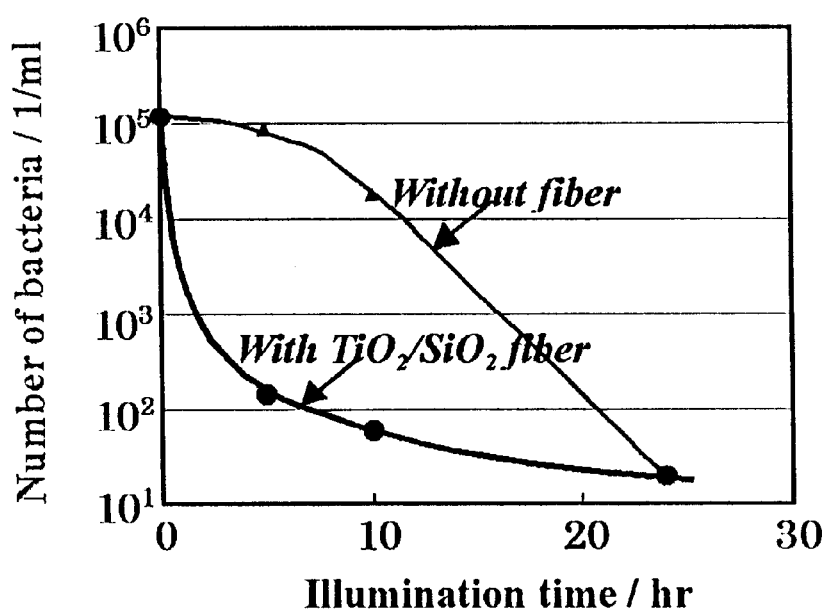
FIG. 3 shows the results of a coliform-killing experiment of the fiber obtained in Example 1 of the present invention.

Then, the fiber was confirmed for photocatalyst activity by checking its killing activity of coliform as follows. 0.2 g of the above fiber was added to 20 milliliters of an aqueous solution having a coliform counting of 100,000 per milliliter, the resultant solution was exposed to ultraviolet light of 0.2 mW/cm$^2$ with a black-light, and a coliform counting living in the solution was measured with the passage of time. FIG. 3 shows the results. In this experiment, an aqueous solution which was different from the above aqueous solution in that the fiber was not contained, was prepared for comparison, and this aqueous solution was similarly exposed to the same ultraviolet light as above. This aqueous solution was also checked. According to the results, it was found that the aqueous solution containing the above fiber had an excellent disinfecting effect.

Example 2

100 g of toluene and 64 g of tetrabutoxytitanium were added to 16 g of the polycarbosilane synthesized in Referential Example 1, the mixture was preliminarily heated at 100° C. for 1 hour, then, the mixture was slowly temperature-increased up to 150° C. to distill the toluene off, the resultant mixture was allowed to react at the above temperature for 5 hours, and then the resultant mixture was temperature-increased up to 250° C. and allowed to react at this temperature for 5 hours to obtain a modified polycarbosilane. 5 g of tetrabutoxytitanium was added to the modified polycarbosilane for the purpose of intentionally allowing an organic metal compound having a low molecular weight to coexist, whereby a mixture of the modified polycarbosilane and the organic metal compound having a low molecular weight was obtained.

The mixture of the modified polycarbosilane and the organic metal compound having a low molecular weight was dissolved in toluene, the solution was placed in a spinning machine made of glass, the mixture was temperature-increased in the spinning machine in which nitrogen had been sufficiently substituted to distill the toluene off, and the resultant solution was melt-spun at 180° C.

The spun fiber was stepwise heated up to 150° C. in air to form an infusible fiber, and the infusible fiber was calcined at 1,200° C. in air for 1 hour to obtain a titania/silica fiber.

The above-obtained fiber (average diameter: 13 μm) was analyzed by X-ray diffraction and it was found that the fiber was composed of an amorphous silica and an anatase type titania. The molar ratio of Ti/Si in the fiber as a whole was 0.17. Further, the fiber was examined for the distribution state of constitutive atoms by EPMA (electro probe microanalysis). The molar ratio of Ti/Si was 0.87 in a region of from the outermost periphery portion to a depth of 1 μm, the molar ratio of Ti/Si was 0.15 in the region of from a depth of 3 μm to 4 μm below the outermost periphery portion, and the molar ratio of Ti/Si was 0.04 in the central portion. Accordingly, it was confirmed that the fiber had a slope constitution in which the titanium increased toward the surface. The fiber had a tensile strength of 1.5 GPa. The above tensile strength of the fiber was remarkably higher than that of an anatase type titania/silica fiber obtained by the conventional sol-gel method.

The existent ratio of titanium oxide based on the fiber as a whole was 46% by weight. The titanium oxide of the fiber surface had an average crystal particle diameter of 8 nm.

Edible oil attached to the surface of the above fiber was effectively decomposed by irradiation with ultraviolet light of 300 to 400 nm, and it was confirmed that the fiber had photocatalyst function.

Comparative Example 1

A modified polycarbosilane was synthesized in the same manner as in Example 2, and the modified polycarbosilane was dissolved in toluene, the mixture was poured in ethanol to precipitate and remove substances having a low molecular weight. Thereafter, the addition of an organic metal compound having a low molecular weight, carried out in Example 2, was not carried out. The resultant solution was melt-spun at 220° C.

The spun fiber was infusibilized in the same manner as in Example 2, and the infusible fiber was calcined at 1,200° C. to obtain a titania/silica fiber.

The above-obtained fiber (average diameter: 13 μm) was analyzed by X-ray diffraction and it was found that the fiber was composed of an amorphous silica and an anatase type titania. The molar ratio of Ti/Si based on the fiber as a whole was 0.04. Further, the fiber was examined for the distribution state of constitutive atoms by EPMA. The molar ratio of Ti/Si was 0.05 in the region of from the outermost periphery portion to a depth of 100 nm, the molar ratio of Ti/Si was 0.04 in the region of from a depth of 3 μm to 4 μm below the outermost periphery portion, and the molar ratio of Ti/Si was 0.05 in the central portion. Accordingly, the fiber did not have a slope constitution but had a uniform constitution distribution.

The fiber had a tensile strength of 1.6 GPa. The above tensile strength of the fiber was remarkably higher than that of an anatase type titania/silica fiber obtained by the conventional sol-gel method. However, since the amount of titania component in a portion close to the surface was small, the fiber did not show the photocatalyst function shown by the fiber of Example 2.

What is claimed is:

1. A silica-group composite oxide fiber formed of a composite oxide phase of an oxide phase (first phase) mainly made of a silica component and a metal oxide phase (second phase) excluding silica, in which the existent ratio of at least one metal element of a metal oxide constituting the second phase upward slopingly increases toward the surface layer of the fiber.

2. A silica-group composite oxide fiber according to claim 1, wherein the existent ratio of the first phase based on the fiber as a whole is 98 to 40% by weight and the existent ratio of the second phase based on the fiber as a whole is 2 to 60% by weight.

3. A silica-group composite oxide fiber according to claim 1, wherein the oxide phase mainly made of a silica component is amorphous or crystalline.

4. A silica-group composite oxide fiber according to claim 1, wherein the oxide phase mainly made of a silica component contains a metal element or a metal compound which can form a solid solution or a eutectic compound with the silica.

5. A silica-group composite oxide fiber according to claim 4, wherein the metal element is at least one metal selected from the group consisting of titanium, aluminum, zirconium, yttrium, lithium, sodium, barium, calcium, boron, zinc, nickel, manganese, magnesium and iron.

6. A silica-group composite oxide fiber according to claim 1, wherein the metal oxide phase excluding silica is made of titania, its eutectic compound or an lead/zirconium/titanium type oxide.

7. A silica-group composite oxide fiber according to claim 1, wherein the slope in the existent ratio of at least one metal element of a metal oxide constituting the metal oxide phase excluding silica exists from the fiber surface to a depth in the range of 5 nm to 500 nm.

8. A silica-group composite oxide fiber according to claim 1, wherein the slope in the existent ratio of at least one metal element of a metal oxide constituting the metal oxide phase excluding silica exists to a depth of ⅓ of the diameter of the fiber.

9. A silica-group composite oxide fiber according to claim 1, wherein the metal oxide of the second phase is titania which has a crystal particle diameter of 15 nm or less and has photocatalyst and/or thermal catalyst functions.

10. A process for the production of the silica-group composite oxide fiber recited in claim 1, which process comprises melt-spinning a modified polycarbosilane having a structure obtained by modification of a polycarbosilane having a main chain structure represented by the formula,

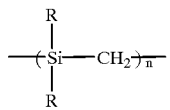

in which R is a hydrogen atom, a lower alkyl group or a phenyl group and n is an integer of 1 to 30,
and having a number average molecular weight of 200 to 10,000 with an organic metal compound, or a mixture of the modified polycarbosilane and an organic metal compound to obtain a spun fiber, infusibilizing the spun fiber, and then calcining the infusible fiber in air or in oxygen.

11. A process according to claim 10, wherein the organic metal compound is a compound having a basic structure of the formula M(OR')n or the formula MR"m, in which M is a metal element, R' is an alkyl group having 1 to 20 carbon atoms or a phenyl group, R" is acetyl acetonate, and each of m and n is an integer of more than 1.

12. A process according to claim 10, wherein the modified polycarbosilane is a product obtained by reacting the polycarbosilane with the organic metal compound at a temperature of 280° C. or lower in an inert gas.

13. A process according to claim 10, wherein the modified polycarbosilane is a product in which the organic metal compound is bonded to the polycarbosilane as a monofunctional polymer.

14. A process according to claim 10, wherein the mixture is formed of the modified polycarbosilane and a low-molecular weight organic metal compound which is a monomer, a dimer or a trimer.

15. A process according to claim 10, wherein the modified polycarbosilane contains a modified polycarbosilane having a low molecular weight.

* * * * *